US012560504B2

(12) United States Patent
Trenchard et al.

(10) Patent No.: US 12,560,504 B2
(45) Date of Patent: Feb. 24, 2026

(54) METHOD AND SYSTEM FOR LOCATING AND QUANTIFYING FUGITIVE EMISSION LEAKS

(71) Applicant: Honeywell International Inc., Charlotte, NC (US)

(72) Inventors: Andrew J. Trenchard, Romsey (GB); Sean Scoggins, Rolesville, NC (US); Bas Kastelein, Hippolytushoef (NL)

(73) Assignee: Honeywell International Inc., Charlotte, NC (US)

( * ) Notice: Subject to any disclaimer, the term of this patent is extended or adjusted under 35 U.S.C. 154(b) by 385 days.

(21) Appl. No.: 18/120,602

(22) Filed: Mar. 13, 2023

(65) Prior Publication Data

US 2023/0375431 A1     Nov. 23, 2023

Related U.S. Application Data

(60) Provisional application No. 63/342,951, filed on May 17, 2022.

(51) Int. Cl.
G01M 3/16          (2006.01)
(52) U.S. Cl.
CPC ..................................... G01M 3/16 (2013.01)
(58) Field of Classification Search
CPC ........... G01M 3/16; G01M 3/20; G01M 3/22; G01N 21/3504; G01N 21/359;
(Continued)

(56) References Cited

U.S. PATENT DOCUMENTS 8,510,059 B2    8/2013   Prince
10,663,367 B2   5/2020   Dittberner et al.
(Continued)

OTHER PUBLICATIONS

European Search Report for corresponding EP Application No. 23171748.9 dated Sep. 22, 2023.

*Primary Examiner* — An H Do
(74) *Attorney, Agent, or Firm* — Paschall & Associates, LLC; James C. Paschall; Anthony Miologos

(57)          ABSTRACT
A method and system for locating and quantifying fugitive gas emission leaks includes obtaining gas sensor data and wind direction data from a plurality of sensors and weather stations located proximate a given area of interest. The gas sensor data and the wind direction data is validated to remove erroneous values and to merge the gas sensor data with the wind direction data to provide time synchronized gas sensor data and wind direction data over a given time interval. The time synchronized gas sensor data and wind direction data is segmented for each gas sensor location into wind direction bins containing a concentration of the gas levels in each bin. The area of interest is divided into a grid of cells and the bins projected on the grid cells for each gas sensor location along with the level of gas contained in the bins. The grid cells are then grouped into one or more contiguous grid cells having gas levels above a predefined level and a boundary area is calculated containing the grid cells with a gas level above a threshold to identify a potential leak area. The potential leak area is matched with a prior calculated leak area to identify the source location of the emission leak.

20 Claims, 8 Drawing Sheets

800

805 — Determine Leak Source / Sensor Distances & Wind Direction Bins

810 — Solve Simplified Gas Dispersion Model to Obtain Initial Estimate Of Leak Rates 815 — Use Initial Estimate of Leak Rates with Gas Dispersion Model

(58) Field of Classification Search
CPC ... G01N 2021/0118; G01N 2201/0216; G01N
2201/0221; G01N 2021/399; G01N
2021/391
See application file for complete search history.

(56) References Cited

U.S. PATENT DOCUMENTS

| 10,775,258 B2 * | 9/2020 | Muralidhar | ............... G01P 5/00 |
| 10,962,437 B1 | 3/2021 | Nottrott et al. | |
| 2019/0340914 A1 * | 11/2019 | Israelsen | ................. G01M 3/04 |

* cited by examiner

500

506 Define Geospatial Grid

508 For All Aggregations, Project The Conical Aggregations Of The Sensor Data

510 Threshold The Grid Cells Based On A Minimum Accumulated Gas Concentration

512 Agglomerate Adjacent Cells With Gas Concentration Above Threshold

514 Extend Agglomerations And Check For Overlaps

518 Reduce Agglomeration Areas To Cells Above Threshold

800

805　Determine Leak Source / Sensor Distances & Wind Direction Bins

810　Solve Simplified Gas Dispersion Model to Obtain Initial Estimate Of Leak Rates 815　Use Initial Estimate of Leak Rates with Gas Dispersion Model

METHOD AND SYSTEM FOR LOCATING AND QUANTIFYING FUGITIVE EMISSION LEAKS

CROSS-REFERENCE TO RELATED APPLICATION AND PRIORITY CLAIM

This application claims priority under 35 U.S.C. § 119(e) to U.S. Provisional Patent Application No. 63/342,951 filed on May 17, 2022. This provisional application is hereby incorporated by reference in its entirety.

TECHNICAL FIELD

This disclosure is generally directed to the field of atmospheric monitoring for emission leaks. More specifically, it relates to a method and system for locating and quantifying fugitive gas emissions leaking to the atmosphere.

BACKGROUND

In many jurisdictions there are strict controls on industrial greenhouse gas emissions, both from combustion sources and from fugitive gas emissions emanating from refinery plant equipment. While there is a greater quantity of combustion related emissions, fugitive gas emissions of uncombusted plant chemicals, such as for example methane gas have a much greater global warming potential for a given mass of emission.

Chemical manufacturing plants, petroleum refineries and other industrial facilities in developed nations are required to make an inventory of all plant equipment assets, such as valves, pumps, flanges, burners, etc., that could potentially be a source of fugitive gas emissions. A plant's operating company is required to periodically monitor the gas concentrations near each asset to ensure there is no significant leak of uncombusted gas from the plant's assets into the atmosphere. This is normally done manually. A technician using a hand-held leak-detection device, as defined by the applicable standards, uses the leak-detection device to inventory the assets for possible fugitive gas emissions. This approach is very time consuming and hence expensive. At large refineries and plants up to 25 technicians are employed full time to monitor all the equipment and assets to make observations and quantifications of emission leaks. The individual assets are only monitored infrequently, such as for example, once a quarter or once a year due to the substantial number of assets required to be monitored. Additionally, the manual methods fail to accurately monitor the rate of emissions being expelled into the atmosphere due to the manual process being error prone. Even in cases where the manual methods are successfully performed, the resulting observations may be too vague or inaccurate to provide a meaningful quantification of the emissions.

SUMMARY

This disclosure relates to a method and system for locating and quantifying fugitive gas, emissions leaking into the atmosphere.

In a first embodiment a method for locating and quantifying fugitive gas emission leaks is disclosed, the method including obtaining gas sensor data from a plurality of gas sensors and wind direction data from at least one weather station, the plurality of sensors and the at least one weather station located proximate a given area of interest. The method further includes, validating the gas sensor data and the wind direction data to remove erroneous values and to merge the gas sensor data with the wind direction data to provide time synchronized gas sensor data and wind direction data over a given time interval. The method also incudes, segmenting the time synchronized gas sensor data and wind direction data for each location of the plurality of gas sensors into wind direction bins containing a concentration of gas levels contained in each bin and divide the area of interest into a grid of cells, projecting the bins on the grid cells for each gas sensor location along with the level of gas contained in the bins. The grid cells are then grouped into one or more contiguous grid cells having gas levels above a predefined level and a boundary area is calculated containing the grid cells with a gas level above a threshold to identify a potential leak area. The potential leak area is matched with a prior calculated leak area to identify the source location of the emission leak.

In a second embodiment, a system for locating and quantifying fugitive gas emission leaks is disclosed. The system comprising a plurality of gas sensors and at least one weather station located proximate an area of interest in a manufacturing plant. A data server operating a data processing program is communicatively coupled to each of the plurality of gas sensors and to the at least one weather station, the data server receiving gas sensor data from each of the plurality of gas sensors and wind direction data from the at least one weather station. The data processing program operates to validate the gas sensor data and the wind direction data to remove erroneous values and store the validated gas sensor data and wind direction data in a historian communicatively coupled to the data server. The gas sensor data and wind direction are fetched from the historian and validated to merge the gas sensor data with the wind direction data to provide time synchronized gas sensor data and wind direction data over a given time interval. The data processing program next operates to segment the time synchronized gas sensor data and wind direction data for each location of the plurality of gas sensors into wind direction bins containing a gas level in each bin and divide the area of interest into a grid of cell. The grid of cells are projected on a display monitor as bins for each gas sensor location along with a representation of the concentration of the level of gas contained in the bins. The data processing program further operates to group the grid cells into one or more contiguous grid cells having gas levels above a predefined level and calculate a boundary area containing the grid cells with a gas level above a threshold and projects the boundary area on the display monitor to identify a potential leak area. A prior calculated leak area is fetched from the historian to match the potential leak area with the prior calculated leak area to identify the source location of the emission leak.

In a third embodiment, a non-transitory computer readable medium is disclosed containing instructions that when executed by a data processing device, causes the data processing device to locate and quantify fugitive gas emission leaks by obtaining gas sensor data from a plurality of gas sensors and wind direction data from at least one weather station. The plurality of sensors and the at least one weather station located proximate a given area of interest. Next instructions are executed that validates the gas sensor data and the wind direction data to remove erroneous values and to merge the gas sensor data with the wind direction data to provide time synchronized as sensor data and wind direction data over a given time interval. The instructions of the computer readable program, segmenting the time synchronized gas sensor data and wind direction data for each location of the plurality of gas sensors into wind direction bins containing a concentration of gas levels contained in each bin and divide the area of interest into a grid of cells, projecting the bins on the grid cells for each gas sensor location along with the level of gas contained in the bins. The grid cells are then grouped into one or more contiguous grid cells having gas levels above a predefined level and a boundary area is calculated containing the grid cells with a gas level above a threshold to identify a potential leak area. The potential leak area is matched with a prior calculated leak area to identify the source location of the emission leak.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
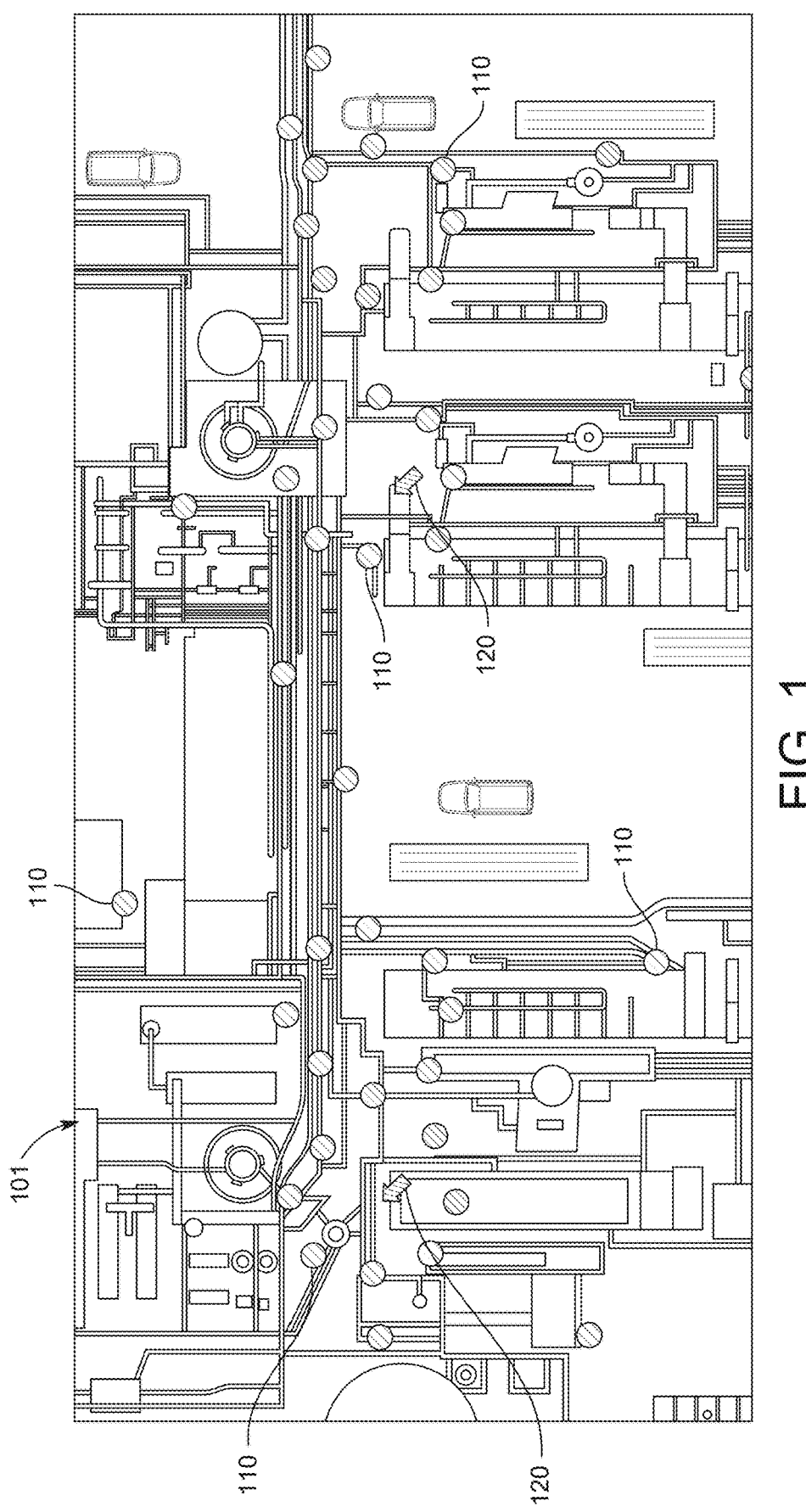
FIG. 1 is an overhead arial view of a manufacturing plant illustrating the placement and locations of gas sensors and weather stations according to the present disclosure.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The embodiment of the present disclosure describes a discretized geospatial model that aggregates wind direction and fugitive gas emission readings from multiple sensors, over a period of time, to build up an estimate of the location of one or more simultaneous gas leaks. The method and system of the model uses plurality of geographically distributed gas sensors, and one or more weather stations located about an industrial facility. As a model-based approach, there is no need for a lengthy training and validation phase following sensor deployment.

Using the wind direction data provided by the weather stations, the method calculates an average wind direction over a given time interval. A maximum and minimum wind direction is calculated over a moving time window. The length of the moving timer window of sample data is based on the wind velocity, the maximum expected gas detection range of the sensors and the frequency of the discrete sampled data. In practice, this is implemented by computing multiple maximum and minimum wind directions, for a range of different moving window sizes, from which the most appropriate range is selected at any sampled time. The method of the present disclosure takes account of the variability in the wind direction. Periods of very high wind variability can be excluded from the analysis data set as part of a data cleansing step.

Time synchronized gas sensor data and wind direction data is segmented for each unique sensor location into small angular wind direction bins, such as, for example every 5 degrees of wind direction. The gas measurement readings for each non-zero sample is linearly divided between all the wind direction bins that contain the maximum and minimum wind direction. In another embodiment the method may use an implementation that divides the gas measurement readings based on a probability distribution of the wind direction between a maximum and minimum wind direction. The values in each bin, for each sensor location, are summed over a longer-term moving analysis window such as for example a 24-hour period. The bins are then used to project or back propagate a probable area of a leak source implemented as a cone shape from each sensor in the opposite direction to the wind direction. This approach enables the uncertainty in the wind direction measurement and the wind variability to be considered. The wind direction binning and summation approach reduces the computational burden by aggregating similar sensor information to reduce the number of samples considered in subsequent analysis steps.

The monitored area of a plant or facility is further divided into a two- or three-dimension grid cells comprised of a plurality of small volumes, which is common for simulation-based approaches such as computational fluid dynamics (CFD) models where one or more leak locations are known. In this disclosure, the grid cells are not being used for simulation, but rather to identify one or more unknown leak locations. In the current implementation a plurality of two-dimensional grid cells are used. A probable leak area is manifested as a cone shaped area and projected into the wind for each sensor location for every wind direction bin with a non-zero accumulation of gas readings. The intersection of each projected cone area with the plant grid cell is allocated a gas level score based on the product of the intersection area and the gas score for the projected cone area. The result provides a gas leakage score for each grid cell and a weighting of a gas level across a geospatial area comprised of multiple grid cells.

The grid cells that fall below a defined threshold of aggregated gas level are eliminated based on the percentile of all grid cells with non-zero aggregated gas levels. The grid cells are then grouped into one or more areas of contiguous cells with a non-zero aggregated gas level. For each grid cell grouping a boundary is then calculated containing the grid cells with a gas level above a predefined threshold.

Figure 2:
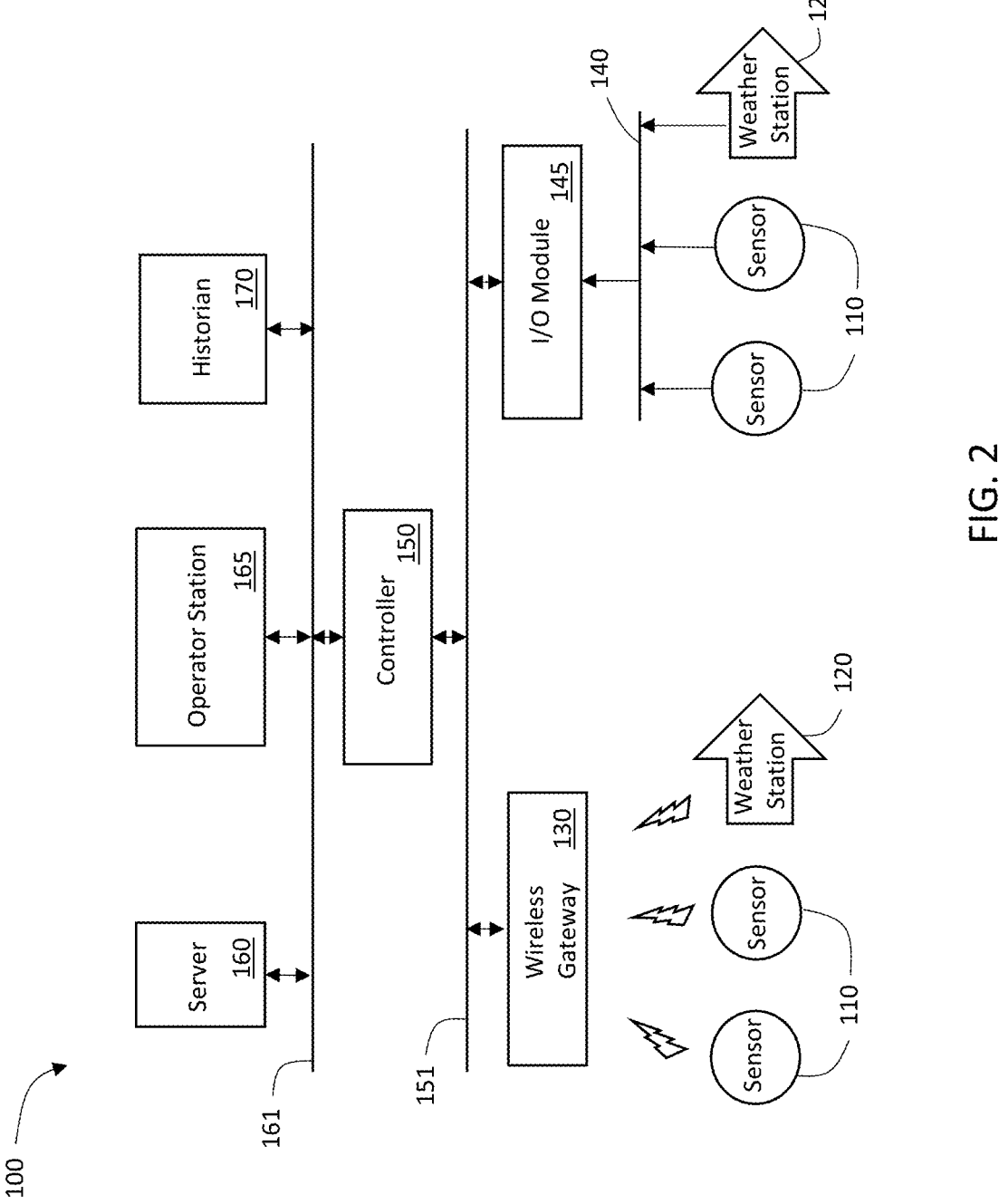
FIG. 2 is a diagram of a system for locating and quantifying fugitive gas emissions leaking into the atmosphere according to the present disclosure.

With reference to FIGS. 1 and 2 the system for locating and quantifying fugitive gas emissions leaked into the atmosphere is illustrated. Multiple gas sensors 110 are geospatially distributed in around external area near assets of a process plant, well-head, factory, or other refining or chemical manufacturing facility that may contain potential leak sources, hereinafter referred to as a plant 101. One or more weather stations 120 are also located near or amongst the gas sensors 120. The weather stations 120 are used to sense and report wind direction, wind speed, temperature and optionally humidity. FIG. 1 illustrates a collection of gas sensors 110 distributed around a plant 101, together with weather stations 120. The gas sensors 110 measure the gas concentration levels at a specific time intervals such as for example, between 2 and 30 seconds and the weather stations 120 also record the wind direction and wind speed at the corresponding gas sensor reading intervals.

FIG. 2 illustrates an exemplary system 100 for gathering information from the gas sensors 110 and weather stations 120 and for processing the information gathered to locate and quantify any fugitive gas emissions from the plant 101. At a device layer of the system 100 the gas sensors 110 and weather stations 120 are connected either to a wireless gateway 130 or through a wired network 140 to an I/O module 145. More than one wireless gateway 130 may be deployed in the device layer each wireless gateway having a plurality of wireless gas sensors 110 and wireless weather stations 120 connected to the wireless gateway 130. Similarly, more than one I/O module 145 may be used to connect to a plurality of wired gas sensors 110 and wired weather stations 120 using a wire network 140.

At a control layer, the system 100 may include one or more controllers 150 connected to wireless gateway 130 and I/O module 145 via a control network 151. The controller 150 can be used in the system 100 to perform various functions in order to control the data gathering process from the gas sensors 110 and weather stations 120. For example, the controller 150 may act as a supervisor to control the transfer of sensor data and weather data from weather data collected by the gateway 130 and I/O module 145. The controller 150 can also be used to provide diagnostic information to the system 100 of the operational health of the wireless gateway 130, I/O module 145 and the gas sensors 110 and weather stations 120 connected to them.

The controller 150 transfers the collected data to a plant server 160 via plant network 161 located at a plant 101 operations layer of the system 100. The server 160 denotes a computing device that executes data processing programs and applications including the method for locating and quantifying fugiWive gas emissions of the present disclosure. The server 160 could represent a computing device running a WINDOWS operating system or other operating system. Note that while shown as being local within system 100, the functionality of the server 160 could be remote from the system 100. For instance, the functionality of the server 160 could be implemented in a computing cloud or a remote server communicatively coupled to the control and automation system 100 via a gateway.

Operator access to and interaction with the controller 150 and other components of the system 100 can occur via one or more operator consoles 165 connected to plant network 161. Each operator console 165 could be used to provide information to an operator and receive information from an operator. For example, each operator console 165 could provide information identifying a current state of a plant process, such as the reported values of gas sensors 110 and weather data from the weather stations 120 and various displays associated with quantification of the fugitive gas emissions process of the present disclosure. Each operator console 165 could also receive information affecting how the industrial process is controlled, such as by receiving setpoints or control modes for the gas sensors 110 and weather stations 120 that alters or affects how the controller 150 controls the system 100. Each operator console 165 includes any suitable structure for displaying information to and interacting with an operator. For example, each operator console 165 could represent a computing device running a WINDOWS operating system or other operating system.

The plant operations layer of system 100 also includes at least one historian 170. The historian 170 represents a component that stores various information about the system 100. The historian 170 could, for instance, store information that is gathered by the gas sensors 110 and weather stations 120 for processing by server 160. The historian 170 includes any suitable structure for storing and facilitating retrieval of information. Although shown as a single component here, the historian 170 could be located elsewhere in the system 100, or multiple historians could be distributed in separate locations in the system 100.

Although FIG. 1 illustrates one example of a system 100, various changes may be made to FIG. 1. For example, the system 100 could include any number of sensors, actuators, controllers, networks, operator consoles, control rooms, historians, servers, wireless devices, and other components. Also, the makeup and arrangement of the system 100 in FIG. 1 are for illustration only. Components could be added, omitted, combined, further subdivided, or placed in any other suitable configuration according to particular needs. Further, particular functions have been described as being performed by particular components of the system 100. This is for illustration only. In general, control systems are highly configurable and can be configured in any suitable manner according to particular needs.

Figure 3:
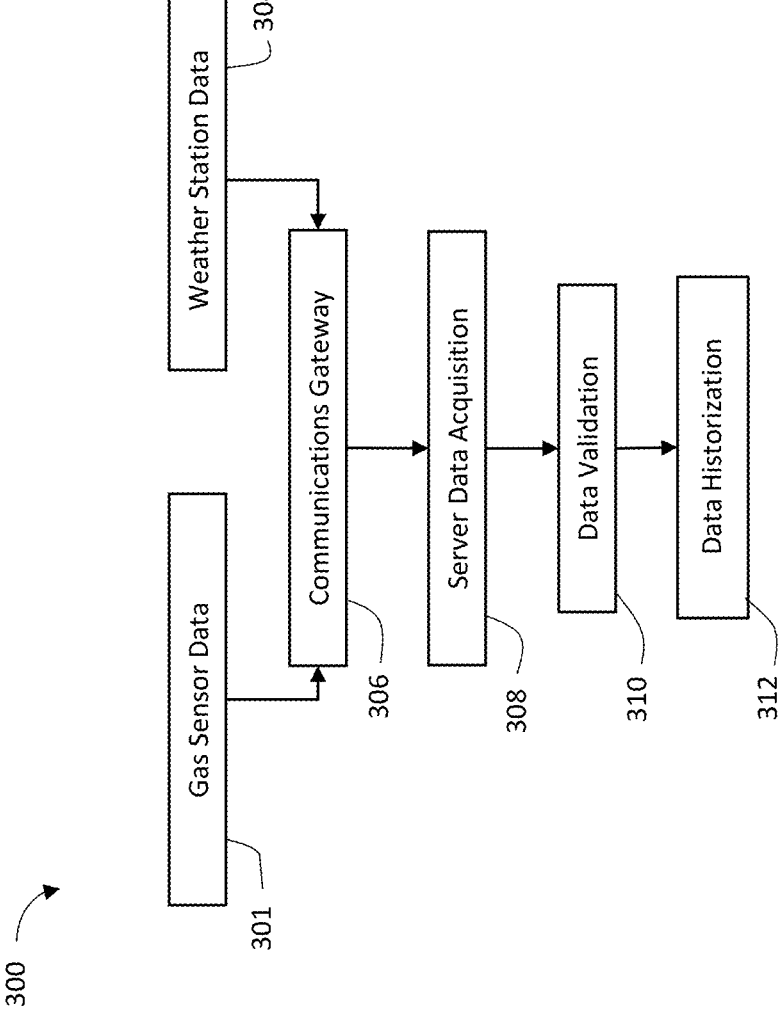
FIG. 3 is a diagram illustrating an exemplary method for the collection and pre-processing of gas sensor data and wind direction data according to the present disclosure.

With reference to FIG. 3, the initial data collection and pre-processing workflow 300 of the method of the present disclosure is illustrated. The sensor data 301 read from the gas sensors 110 and the weather data 304 read from weather stations 120 are transmitted in operation 306 wirelessly to the local gateway 130 or via wired network 145 to I/O module 140. The sensor data 301 and weather data 304 are then transferred by controller 150 and acquired 308 by the server 160. In operation 310 the sensor data 301 and weather data 304 are validated to remove erroneous values defined as bad data, including but not limited to: (i) the quality status for the gas sensor data 301 and weather data 304 that are outside of a high and low range; (ii) the quality status for the gas sensor data 301 and weather data 304 that exhibit a high rate of change above a pre-defined limit for the current timestamp and a configurable number of subsequent sample intervals; (iii) the quality status for the gas sensor data 301 and weather data 304 that remain frozen at for example, a non-zero value for more than a pre-defined period of time; and (iv) the quality status for the gas sensor data 301 and weather data 304 that do not send a new value update from a gas sensor 110 or weather station 120 within a predefined period of time. The validated gas sensor and weather station data is stored in historian 170 in operation 312 for later retrieval by the aggregation workflow of FIG. 4.

Figure 4:
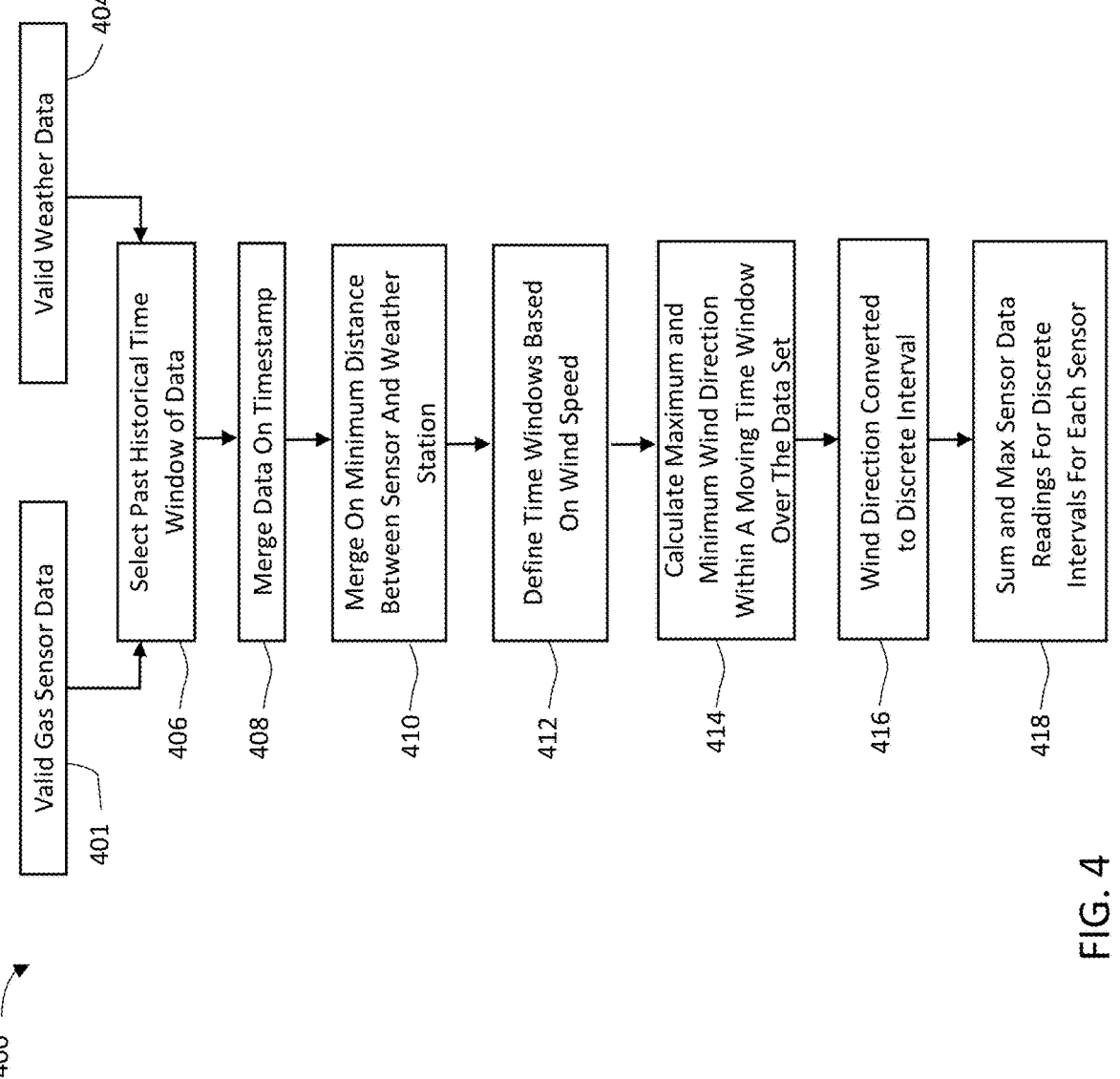
FIG. 4 is a diagram illustrating of an exemplary method for data aggregation according to the present disclosure.

FIG. 4 illustrates the initial data aggregation workflow 400 of the method of the present disclosure. The server 160 fetches the validated data stored in historian 170 by the initial data collection and pre-processing workflow 300. The valid weather data 404 consists of: windspeed; windspeed data quality; wind direction; wind direction data quality; temperature; temperature data quality; humidity; humidity data quality; pressure; pressure data quality; for each weather station 120 together with the weather stations location such as the latitude, longitude, and altitude of the weather station.

The valid gas sensor data 404 from the historian 170 is sampled in operation 406 for a historical time window of data, typically ending at the current time, except for post analysis use cases. The duration of the historical time window can be adapted based on the information content and the accuracy of results required. For example, if the gas detection events are infrequent a longer time windows will generally be required to estimate one or more leak sources.

Next in operation 408 the weather data 401 and sensor data 404 are merged. Non-zero gas sensor data is paired with the corresponding wind direction and windspeed data on the basis of the nearest timestamp. If multiple weather stations 120 are available, the values of the gas sensors data 401 are paired with the geographically nearest valid wind direction and wind speed data that is nearest to each gas sensor 120 in operation 410.

In operation 412 a moving time window is defined based on the wind speed for each gas sensor 110. The window length chosen for the moving time window can be adjusted based on the sensor detection time and an expected travel time duration, typically of 30 seconds. The window length is used in operation 414 to calculate the maximum and minimum wind direction within the moving time window for every event in the data set, taking into account wind speed. At high windspeeds, the travel time of the molecules from leak to sensor is shorter so there is a lesser effect of the stochastic wind variations and thus, a shorter moving time window is used. At low wind speeds, travel time is longer and the moving time window can be set to a longer moving time window. Periods of extremely low wind speed and high wind direction variability are excluded from the analysis. It should be noted that there is transportation delay (dead time) between leaked gas and sensing by remote sensors. The dead time depends on leak rate, sensor proximity, gas plume characteristics, and wind speed and direction. Triangulation of leak locations requires sensor readings from at least two sensors, which for a fixed leak location requires at least two wind directions. Because of the stochastic nature of wind and lag during the travel (dead time) of a gas molecule from a leak to sensors and the need to acquire data over multiple wind directions, it is important to integrate sensor readings for some period before triangulation can take place. Longer integration periods result in increased confidence when triangulating at the expense of a delay in producing the prediction. This disclosure uses an adaptive process for time windowing of these sensor values. The integration period can be redefined from a fixed window of time to a period required to meet certain conditions required for confident predictions.

The result of operation 414 is a timeseries table (data frame) for each sensor/location, shown in Table 1 below.

TABLE 1

| Timestamp | Methane PPM | Sensor Name | Lat | Lon | Altitude | Wind Speed | Max Wind Direction | Min Wind Direction |
|---|---|---|---|---|---|---|---|---|
| 2022 Apr. 20 11:33:21 + 00:00 | 126 | 17AI004 | 52 | 7 | 10 | 1.23 | 37 | 7 |
| 2022 Apr. 20 11:33:21 + 00:00 | 150 | 17AI116 | 52 | 7.001 | 12 | 1.23 | 37 | 7 |
| . . . | . . . | . . . | . . . | . . . | . . . | . . . | . . . | . . . |
| 2022 Apr. 20 11:33:21 + 00:00 | 300 | 17AI004 | 52 | 7 | 10 | 0.4 | 345 | 7 |

For each unique gas sensor and gas sensor location combination (allowing for sensors to be moved), the wind direction is converted to a categorical variable by "cutting" or "binning" the wind direction into multiple discrete intervals, such as 0 to <5°, 5° to <10°, . . . , 355° to <360 by operation 416. The discrete interval range is configurable. When the max (maximum) and min (minimum) wind direction range is greater than the discrete interval range (as is the case for row 1 of Table 1), the gas sensor readings are divided and allocated equally across all the discrete intervals within the max-min wind direction range. For example, Table 2 illustrates how the data in row 1 of Table 1 would be linearly (evenly) distributed between the wind direction bins in the range of 5° to <100 to 350 to <40°. In other embodiments, different distributions such as a Gaussian or historical wind variations, can also be utilized.

TABLE 2

| | Interval | | | | | | | | |
| | | | | | | | | | |
| 0° to <5° | 5° to <10° | 10° to <15° | 15° to <20° | 20° to <25° | 25° to <30° | 30° to <35° | 35° to <40° | 40° to <45° | 45° to <50° |
| --- | --- | --- | --- | --- | --- | --- | --- | --- | --- |
| Gas Level | | | | | | | | | |
| 0 | 18 | 18 | 18 | 18 | 18 | 18 | 18 | 0 | 0 |

In operation 418 for each unique gas sensor and gas sensor location combination, the gas readings are totalized for each wind direction bin. This operation enables a large amount of similar gas sensor data readings to be reduced to a smaller data set without losing the triangulation information provided by the binning. The result is a timeseries table (data frame) for each sensor/location shown in Table 3.

TABLE 3

| Timestamp | Sensor Name | Lat | Lon | Altitude | Wind Speed | Gas for Wind Direction 0-5° | Gas for Wind Direction . . . | Gas for Wind Direction 355°-360° |
| --- | --- | --- | --- | --- | --- | --- | --- | --- |
| 2022 Apr. 20 11:33:21 + 00:00 | 17AI004 | 52 | 7 | 10 | 1.23 | 1034 | 1126 | 7 |
| 2022 Apr. 20 11:33:21 + 00:00 | 17AI116 | 52 | 7.001 | 12 | 1.23 | 670 | 15 | 2002 |

Upon completion of the data workflow aggregation of FIG. 4. The method of the present disclosure uses a geospatial triangulation workflow to manifest a cone shaped area for each sensor location for every wind direction bin with a non-zero accumulation of gas data readings. With references to FIGS. 5-7 the geospatial triangulation method 500 of the disclosure is shown. Depending on whether there is significant height change across the potential gas emission locations and different sensor positions, either a two-dimensional planar grid or three-dimensional array of volumes is defined in order to describe potential emission locations within the facility. The individual grid/volume resolution is configurable in operation 506 which develops a plurality of conical projections 610 denoted by boundaries 615 illustrated in FIG. 6. The conical projections are then displayed on a display monitor of the operator station 165.

Figure 5:
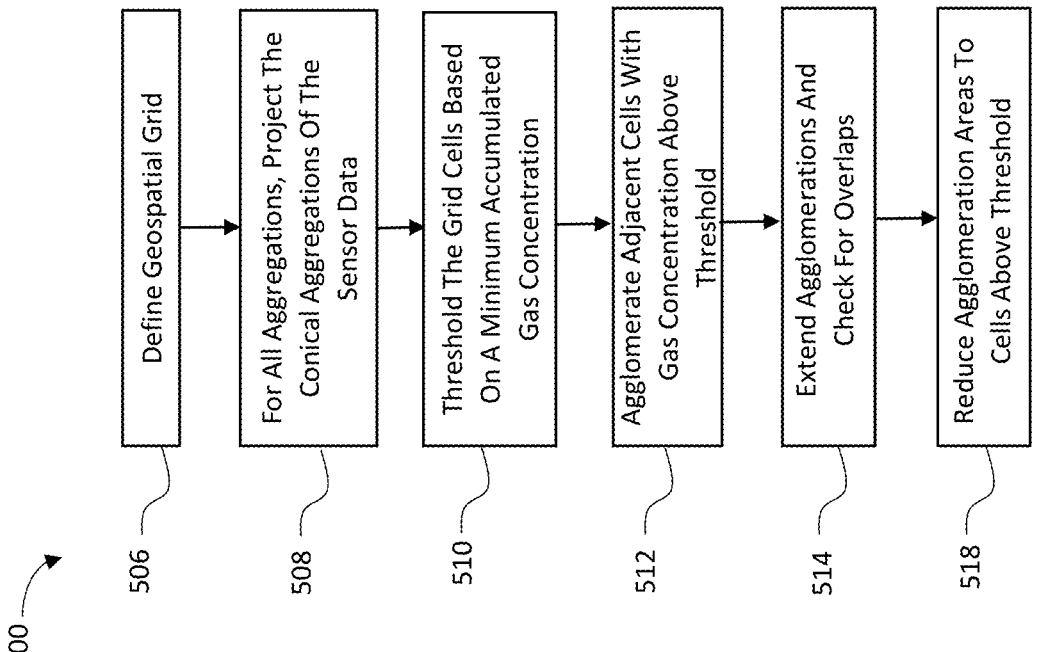
FIG. 5 is a diagram illustrating a method for the geospatial triangulation of the aggregated data from FIG. 4 according to the present disclosure.
Figure 6:
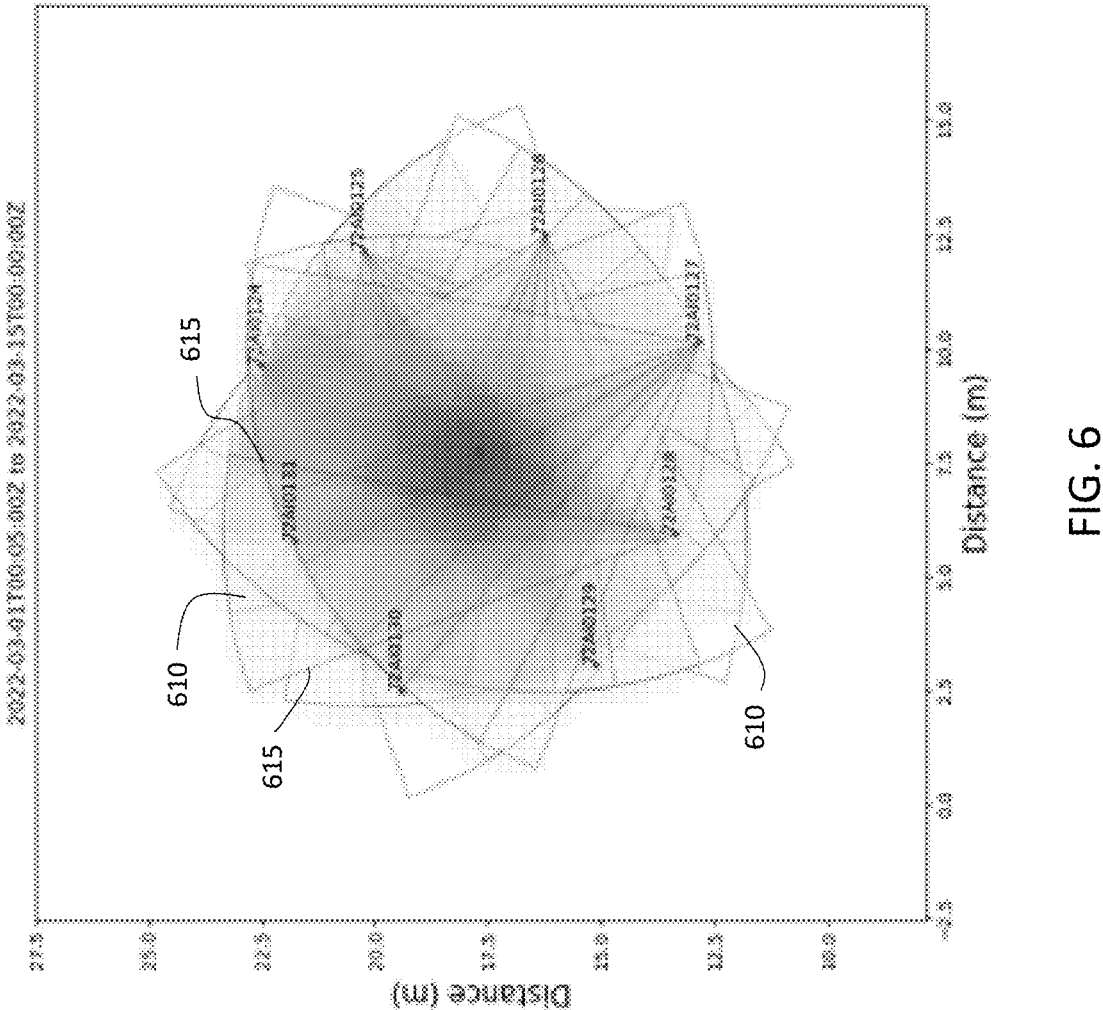
FIG. 6 is an illustration of a cone projection including gas concentration values according to the present disclosure.

A two-dimensional planar grid composed of grid cells will be used to in explaining the cone projections shown in FIG. 6. For each conical projection 610 shown in FIG. 6, the workflow of FIG. 5 computes in operation 508 intersections for the cone projections with all the plant/site grid cells. In each case, the aggregated gas sensor data readings are added to an accumulated gas concentration value within each grid cell based on the area of intersection. Any element wholly within the cone receives a full allocation. Partial intersections receive an allocation based on the area of overlap. In FIG. 6, the accumulated gas concentration values in each grid cell are illustrated by the degree of shading concentration. On a colour display monitor of an operator station for example, the degree of shading may be illustrated to a user using concentrations of a specific colour to show the accumulated gas concentrations.

After all the aggregated gas sensor readings have been projected for the discretized wind directions, the accumulated gas concentrations within each grid cell are used to rank order the cells. In operation 510 the grid cells below a minimum threshold, for example based on the lowest 10% of all the cell concentrations, are dropped from the methods analysis. The remaining grid cells are then grouped together in operation 512 into agglomerations. More specifically, the grid cells are combined together if they are adjacent and have a non-zero (above a threshold) gas concentrations. Grid cells with a zero concentration delineate the agglomerations. Each cell agglomeration is extended by a small configurable buffer zone and the agglomerations are then checked for overlaps. Overlapping agglomerations are then merged to minimise small, fragmented agglomerations in operation 514.

Figure 7:
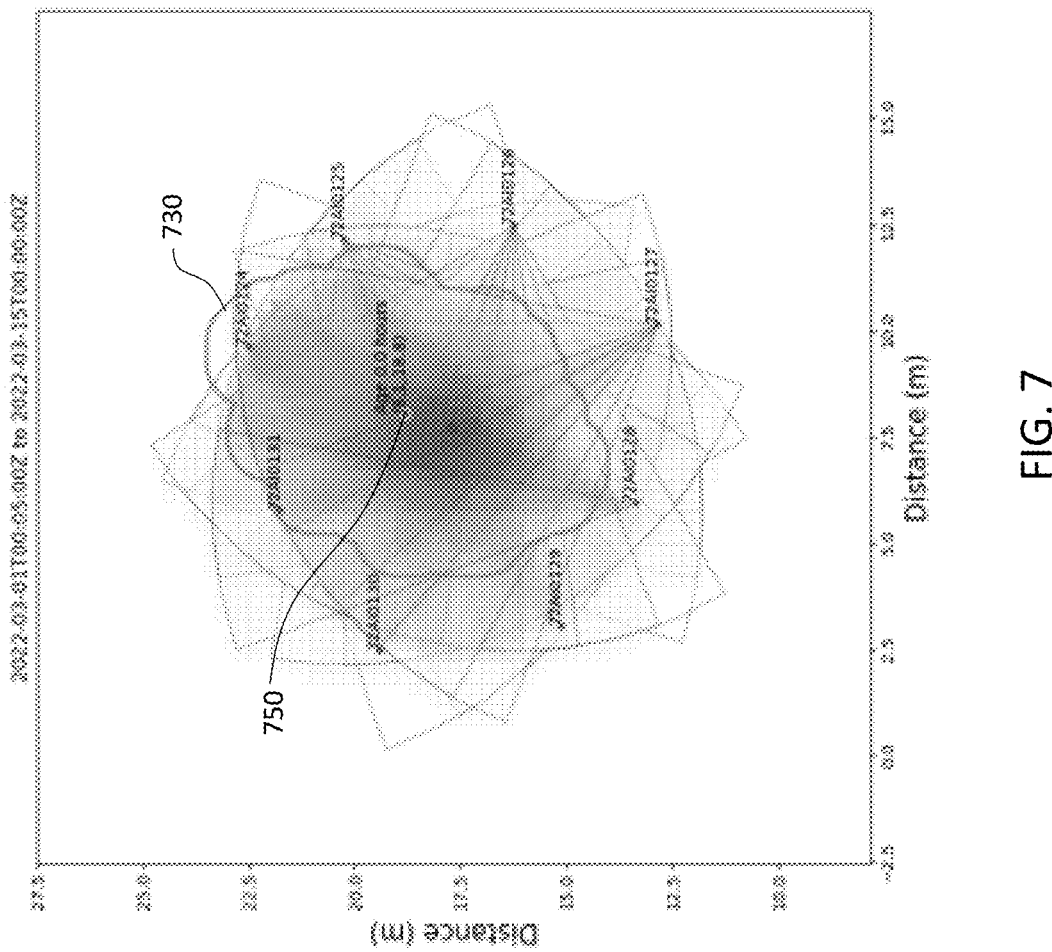
FIG. 7 is an illustration of a cone projection including a boundary and a centroid for a potential leak area according to the present disclosure.

Finally, the grid cells in each agglomerated area are reduced to those with the greatest, for example top 20% gas concentration in operation 518 and a boundary 730 shown in FIG. 7 is drawn around each set of filtered cells. In some cases, this results in two or more distinct sub-groups of grid cells and are delineated by the grid cells that fall below the threshold of gas concentration.

For each newly identified leak area identified based on the last historical window of data of the workflow of FIG. 5, a match is sought with a previously identified leak area from prior data sets stored in the historian 170. This matching process is primarily based on heuristics including: (i) if there is a significant area of overlap (as defined by a % limit) between a newly identified leak area and an existing leak area, then the new leak is matched with the old leak and the existing leak area is updated based on a weighted combination of the intersection and the union of the two areas; (ii) if the new leak area significantly overlaps multiple existing leak areas, then the existing leak areas are combined otherwise, the newly identified leak is assigned a new leak id and added to the list of existing leak areas; and (iii) leak areas that have not been observed for a configurable period of time are not reported to the leak detection method. Their location is persisted for another configurable period of time. A centroid 750 is then calculated for the leak area source based on the shape and level of gas estimated for each grid cell area.

The estimated location of the leak(s), together with the magnitudes of the fugitive gas emissions detected around the suspected leak is used with a sensor type specific calibration model to provide an initial estimate of the leak size. The initial estimate of a leak size is then used as the initial conditions for a non-linear first principles model that more accurately quantifies the leak rate.

Figure 8:
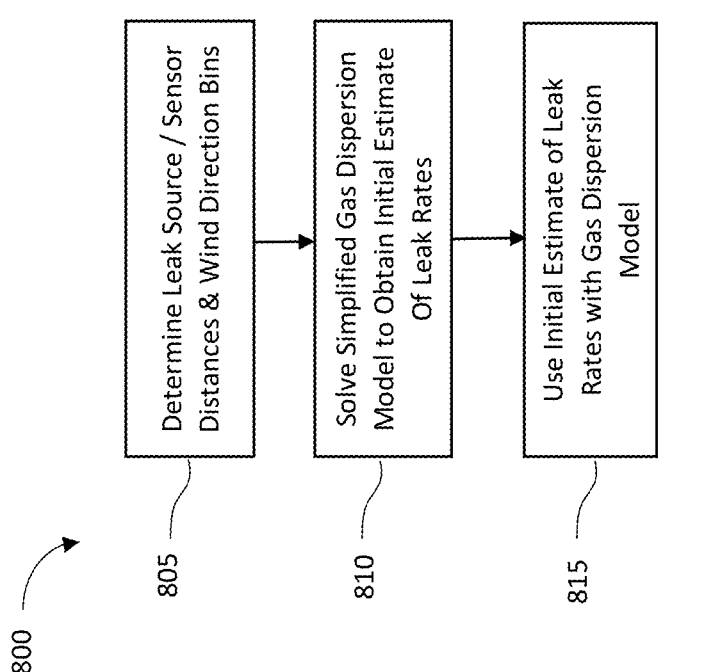
FIG. 8 is a diagram illustrating a method for a leak size quantification according to the present disclosure.

FIG. 8 illustrates the leak size quantification workflow method 800 used by the present disclosure. An initial estimate of the leak rate (for each leak area) is calculated based on a simplified form of the gas dispersion model described by Turner (Turner, D. B. 1970 Workbook of Atmospheric Dispersion Estimates, AP-26. Research Triangle Park, North Carolina: Environmental Protection Agency, Office of Air programs). This requires determining in operation 805 one or more sets of peak gas measurements, estimated straight-line distances from the sensors and the leak area centroids for the matching wind direction bins, and a maximum gas reading is calculated for each sensor location and wind direction bin. For the cases where the wind direction bin aligns with the direction of the gas flow from the source to the sensor (for non-zero gas levels), the gas level and sensor to source distance is recorded.

The simplified equation is then solved in operation 810 for the recorded data sets to provide the initial estimate of the leak rate(s). This is based on the Gaussian plume model of Turner.

$$C(x, y, z) = \frac{Q}{2\pi U \sigma_y \sigma_z} \left[ e^{\frac{-y^2}{2\sigma_y^2}} \right] \left[ e^{\frac{(z-H)^2}{2\sigma_z^2}} + e^{\frac{(z+H)^2}{2\sigma_z^2}} \right]$$

Where:
c(x,y,z)=mean (time average) concentration of diffusing substance at a point (x,y,z) [kg/m3]
x=downwind distance [m]
y=crosswind distance [m]
z=vertical distance above ground [m]
Q=gas (contaminant) emission rate [kg/s]
$\sigma_y$=lateral dispersion coefficient function [m]
$\sigma_z$=vertical dispersion coefficient function [m]
U=mean wind velocity in downwind direction [m/s]
H=effective leak source or stack height [m] (which is the actual height but can be adjusted for plume rise for buoyancy and thermal effects)

The crosswind distance (y) and vertical distance terms (z, H) are ignored in the simplified Equation 2 below for a horizontal straight-line assumption.

$$C(x, y, z) = \frac{Q}{\alpha \pi U \sigma_y \sigma_z} \qquad \text{Equation 2}$$

Which Rearranges to:

$$Q = C(x,y,z) \pi U \sigma_y \sigma_z \qquad \text{Equation 3}$$

From Koch & Thayer (Koch, R. C., & Thayer, S. D. (1971). *Validation and Sensitivity Analysis of the Gaussian Plume Mutiple-Source Urban Diffusion Model*. Research Triangle Park, North Carolina: Environmental protection Agency, National Environmental Research Center) Table 1, $\sigma_y$ and $\sigma_z$ can be estimated:

$$\sigma_y = ax^{0.903} \qquad \text{Equation 4}$$

$$\sigma_z = bx^q \qquad \text{Equation 5}$$

Where parameters a,b and q depend on the meteorologic wind stability condition. (Koch & Thayer, 1971) Table 1 defines estimates of a,b and q for the meteorologic wind stability conditions defined by Gifford (Gifford, 1961). These conditions are:
Extremely Unstable
Moderately Unstable
Slightly Unstable
Neutral
Slightly Stable
As a result, Equation 3 can be simplified by Equation 6.

$$Q = aC(x,y,z) \pi U x^\beta \qquad \text{Equation 6}$$

For the mid-range weather condition of slightly unstable, a=0.0222 and β=1.81. However, these parameters can be can also be experimentally determined from sensor calibration data or CFD simulations where available.

In operation 815 of FIG. 8, each leak source initial estimate is used with a full Gaussian dispersion model and a complete data set to estimate the leak rate. A simplifying assumption is made that a fixed wind stability condition (mid-range in the meteorologic wind stability conditions) can be used to compute a base value of σz, σy for any given x,y,z distance from the leak source, namely $\sigma z_b$, $\sigma y_b$. A continuous model parameter k is then determined by the method to calculate actual values of σz, σy which gives the best fit of the model to the observed sensor readings, while estimating the leak rate, for example:

$$\sigma y = k^* \sigma y_b$$

$$\sigma z = k^* \sigma z_b \qquad \text{Equation 7}$$

The k factor effectively compensates for the unknown wind stability condition.

For a known measurement of gas concentration at an estimated distance x,y,z from an emission source, the following prediction error estimate can be formulated with two unknowns, the leak rate Q, and the wind stability model parameter k.

Equation 8

Error Squared for Single Observation $$\left(Cm - \frac{Q\left(e^{\frac{(-H-z)(H+z)}{2k^2\sigma zb^2}} + e^{\frac{(-H+z)(H-z)}{2k^2\sigma zb^2}}\right)e^{-\frac{y^2}{2k^2\sigma yb^2}}}{2Uk^2\pi\sigma yb\sigma zb}\right)^2$$

This error can be summed over multiple estimates of sensor to source distances and corresponding gas concentration ppm levels to define an objective function using Equation 8. The objective function is then differentiated with respect to the two unknown variables by solving for a partial derivative of the squared error with respect to parameter k and to the squared error with respect to the leak rate Q. The derivatives are used to formulate an update to the estimates of the model parameters based on the standard gradient descent method, using Equation 9.

Equation 9

$$\theta_{n+1} = \theta_n - a\frac{1}{m}\sum_{i=1}^{m} \frac{\partial\left(h_\theta\left(x^{(i)}\right) - y^{(i)}\right)}{\partial\theta}$$

A key challenge implementing the gradient descent method with the derivatives of the Gaussian Plume model is that that they are very non-linear and the convergence time to a minimum error is very dependent on the initial conditions. The initial conditions provided by the sensor calibration curve enable the equation to be solved robustly in a timely fashion.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component,"

"element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for detecting emission leaks, comprising:
   simultaneously receiving, by a processor, gas sensor data from each gas sensor of a plurality of gas sensors positioned at a plurality of locations, and wind direction data from at least one weather station, during a predetermined time interval, wherein the reception of the gas sensor data and the wind direction data is time synchronized;
   determining, by the processor, a distribution of the gas sensor data of each gas sensor of the plurality of gas sensors at each of the plurality of locations based on a predetermined distribution of wind direction data at each location of the plurality of locations;
   determining, by the processor, at least one location indicative of a source of an emission leak based on projecting the distribution of the gas sensor data of each gas sensor of the plurality of gas sensors using at least triangulation;
   controlling, by the processor, at least one gas sensor of the plurality of gas sensors and the at least one weather station based on the at least one determined location for selectively receiving the gas sensor data and the wind direction data; and
   quantifying, by the processor, a value of an actual leak rate based at least on the gas sensor data and the wind direction data selectively received from the at least one gas sensor and the at least one weather station associated with the at least one determined location.

2. The method of claim 1, wherein determining the at least one location indicative of the source of the emission leak, comprises:
   dividing an area of interest into a grid comprising a plurality of cells;
   projecting the distribution of the gas sensor data of each gas sensor of the plurality of gas sensors based on a corresponding representation of the predetermined distribution of wind direction data on the grid for each gas sensor location using at least the triangulation;
   grouping one or more cells of the grid into one or more contiguous grid cells, wherein each of the one or more contiguous grid cells have aggregated concentration of gas levels above a predefined level;
   calculating a boundary area containing the one or more contiguous grid cells with the aggregated concentration of gas levels above a threshold to identify a potential leak area; and
   matching the potential leak area with a prior calculated leak area to identify the source of the emission leak.

3. The method of claim 1, further comprising:
   determining, by the processor, an initial estimate of a leak size at the source of the emission leak, a magnitude of the emission leak detected around the at least one location and a gas sensor type specific calibration model.

4. The method of claim 3, further comprising:

solving, by the processor, a simplified gas dispersion model using the initial estimate of the leak size to obtain an initial estimate of a rate of the emission leak; and quantifying, by the processor, a value of an actual leak rate using the initial estimate of the leak size.

5. The method of claim 1, further comprising:

projecting, by the processor, on a display monitor each of the predetermined distribution of wind direction data along with a representation of respective distribution of the gas sensor data of each gas sensor of the plurality of gas sensors at each of the plurality of locations using a geospatial triangulation.

6. The method of claim 1, wherein determining the distribution of the gas sensor data of each gas sensor of the plurality of gas sensors at each of the plurality of locations, comprises:

defining a moving time window for determining the distribution of the gas sensor data of each gas sensor of the plurality of gas sensors at each of the plurality of locations based at least on a wind speed for each gas sensor;

determining a maximum wind direction and a minimum wind direction within the moving time window;

determining a difference between the maximum wind direction and the minimum wind direction of the moving time window;

determining if the difference is greater than a discrete wind direction interval, wherein the discrete wind direction interval is determined based on at least the predetermined distribution of wind direction data;

on determining the difference is greater than the discrete wind direction interval, distribute the gas sensor data equally across a set of wind direction bins of a plurality of wind direction bins based on the maximum wind direction and the minimum wind direction, wherein the plurality of wind direction bins correspond to the predetermined distribution of wind direction data; and determining a gas level in each wind direction bin over a predefined interval by integrating a concentration of gas sensor data of each wind direction bin of the plurality of wind direction bins associated with each of the plurality of gas sensors.

7. The method of claim 6, wherein defining the moving time window, comprises:

adapting a length of the moving time window based on at least the wind speed, a detection time of a gas corresponding to each of the plurality of gas sensors and an expected travel time of the gas from the at least one location indicative of the source of the emission leak to a corresponding location associated with the gas sensor.

8. The method of claim 7, wherein the discrete wind direction interval is configurable.

9. A system for detecting emission leaks, comprising:

a plurality of gas sensors positioned at a plurality of locations proximate an area of interest in a manufacturing plant;

at least one weather station located proximate the area of interest;

a data server communicatively coupled to the plurality of gas sensors and to the at least one weather station, the data server comprising:

a data processing program, and a processor configured to execute the data processing program which causes the processor to:

simultaneously receive gas sensor data from each gas sensor of the plurality of gas sensors and wind direction data from the at least one weather station, during a predetermined time interval, wherein the reception of the gas sensor data and the wind direction data is time synchronized;

determine a distribution of the gas sensor data of each gas sensor of the plurality of gas sensors at each of the plurality of locations based on a predetermined distribution of wind direction data at each location of the plurality of locations; and determine at least one location indicative of a source of an emission leak based on projecting the distribution of the gas sensor data of each gas sensor of the plurality of gas sensors using at least triangulation;

control at least one gas sensor of the plurality of gas sensors and the at least one weather station based on the at least one determined location for selectively receiving the gas sensor data and the wind direction data; and quantify a value of an actual leak rate based at least on the gas sensor data and the wind direction data selectively received from the at least one gas sensor and the at least one weather station associated with the at least one determined location.

10. The system of claim 9, wherein for determining the at least one location indicative of the source of the emission leak, the processor is further configured to:

divide the area of interest into a grid comprising a plurality of cells;

project the distribution of the gas sensor data of each gas sensor of the plurality of gas sensors based on a corresponding representation of the predetermined distribution of wind direction data on the grid for each gas sensor location using at least the triangulation;

grouping one or more cells of the grid into one or more contiguous grid cells, wherein each of the one or more contiguous grid cells have aggregated concentration of gas levels above a predefined level;

calculating a boundary area containing the one or more contiguous grid cells with the aggregated concentration of gas levels above a threshold to identify a potential leak area; and matching the potential leak area with a prior calculated leak area to identify the source of the emission leak.

11. The system of claim 9, wherein the processor is further configured to:

determine an initial estimate of a leak size at the source of the emission leak, a magnitude of the emission leak detected around the at least one location and a gas sensor type specific calibration model.

12. The system of claim 11, wherein the processor is further configured to:

solve a simplified gas dispersion model using the initial estimate of the leak size to obtain an initial estimate of a rate of the emission leak; and quantify a value of an actual leak rate using the initial estimate of the leak size.

13. The system of claim 9, wherein for determining the distribution of the gas sensor data of each gas sensor of the plurality of gas sensors at each of the plurality of locations, the processor is configured to:

define a moving time window for determining the distribution of the gas sensor data of each gas sensor of the plurality of gas sensors at each of the plurality of locations based at least on a wind speed for each gas sensor;

determine a maximum wind direction and a minimum wind direction within the moving time window;

determine a difference between the maximum wind direction and the minimum wind direction of the moving time window;

determine if the difference is greater than a discrete wind direction interval, wherein the discrete wind direction interval is determined based on at least the predetermined distribution of wind direction data;

on determining the difference is greater than the discrete wind direction interval, distribute the gas sensor data equally across a set of wind direction bins of a plurality of wind direction bins based on the maximum wind direction and the minimum wind direction, wherein the plurality of wind direction bins correspond to the predetermined distribution of wind direction data; and determine a gas level in each wind direction bin over a predefined interval by integrating a concentration of gas sensor data of each wind direction bin of the plurality of wind direction bins associated with each of the plurality of gas sensors.

14. A data server for detecting emission leaks, the data server comprising:

a data processing program, and a processor configured to execute the data processing program which causes the processor to:

simultaneously receive gas sensor data from each gas sensor of a plurality of gas sensors positioned at a plurality of locations, and wind direction data from at least one weather station, during a predetermined time interval, wherein the reception of the gas sensor data and the wind direction data is time synchronized;

determine a distribution of the gas sensor data of each gas sensor of the plurality of gas sensors at each of the plurality of locations based on a predetermined distribution of wind direction data at each location of the plurality of locations;

determine at least one location indicative of a source of an emission leak based on projecting the distribution of the gas sensor data of each gas sensor of the plurality of gas sensors using at least triangulation;

control at least one gas sensor of the plurality of gas sensors and the at least one weather station based on the at least one determined location for selectively receiving the gas sensor data and the wind direction data; and quantify a value of an actual leak rate based at least on the gas sensor data and the wind direction data selectively received from the at least one gas sensor and the at least one weather station associated with the at least one determined location.

15. The data server of claim 14, wherein to determine the at least one location indicative of the source of the emission leak, the processor is configured to:

divide an area of interest into a grid comprising a plurality of cells;

project the distribution of the gas sensor data of each gas sensor of the plurality of gas sensors based on a corresponding representation of the predetermined distribution of wind direction data on the grid for each gas sensor location using at least the triangulation;

group one or more cells of the grid into one or more contiguous grid cells, wherein each of the one or more contiguous grid cells have aggregated concentration of gas levels above a predefined level;

calculate a boundary area containing the one or more contiguous grid cells with the aggregated concentration of gas levels above a threshold to identify a potential leak area; and match the potential leak area with a prior calculated leak area to identify the source of the emission leak.

16. The data server of claim 14, wherein the processor is further configured to:

cause display, on a display monitor, each of the predetermined distribution of wind direction data along with a representation of respective distribution of the gas sensor data of each gas sensor of the plurality of gas sensors at each of the plurality of locations using a geospatial triangulation.

17. The data server of claim 14, wherein the processor is further configured to:

determine an initial estimate of a leak size at the source of the emission leak based on the at least one location indicative of the source of the emission leak, a magnitude of the emission leak detected around the at least one location and a gas sensor type specific calibration model.

18. The data server of claim 17, wherein the processor is further configured to:

solve a simplified gas dispersion model using the initial estimate of the leak size to obtain an initial estimate of a rate of the emission leak; and quantify a value of an actual leak rate using the initial estimate of the leak size.

19. The data server of claim 14, wherein to determine the distribution of the gas sensor data of each gas sensor of the plurality of gas sensors at each of the plurality of locations, the processor is further configured to:

define a moving time window for determining the distribution of the gas sensor data of each gas sensor of the plurality of gas sensors at each of the plurality of locations based at least on a wind speed for each gas sensor;

determine a maximum wind direction and a minimum wind direction within the moving time window;

determine a difference between the maximum wind direction and the minimum wind direction of the moving time window;

determine if the difference is greater than a discrete wind direction interval, wherein the discrete wind direction interval is determined based on at least the predetermined distribution of wind direction data;

on determining the difference is greater than the discrete wind direction interval, distribute the gas sensor data equally across a set of wind direction bins of a plurality of wind direction bins based on the maximum wind direction and the minimum wind direction, wherein the plurality of wind direction bins correspond to the predetermined distribution of wind direction data; and determine a gas level in each wind direction bin over a predefined interval by integrating a concentration of gas sensor data of each wind direction bin of the plurality of wind direction bins associated with each of the plurality of gas sensors.

20. A non-transitory computer readable medium containing instructions that when executed by a data processing device, causes the data processing device to detect emission leaks by:

simultaneously receiving gas sensor data from each gas sensor of a plurality of gas sensors positioned at a plurality of locations proximate an area of interest in a manufacturing plant and wind direction data from at least one weather station proximate the area of interest, during a predetermined time interval, wherein the reception of the gas sensor data and the wind direction data is time synchronized; and determining a distribution of the gas sensor data of each gas sensor of the plurality of gas sensors at each of the plurality of locations based on a predetermined distribution of wind direction data at each location of the plurality of locations;

determining at least one location indicative of a source of an emission leak based on projecting the distribution of the gas sensor data of each gas sensor of the plurality of gas sensors using at least triangulation;

controlling, by the processor, at least one gas sensor of the plurality of gas sensors and the at least one weather station based on the at least one determined location for selectively receiving the gas sensor data and the wind direction data; and quantifying, by the processor, a value of an actual leak rate based at least on the gas sensor data and the wind direction data selectively received from the at least one gas sensor and the at least one weather station associated with the at least one determined location.

\* \* \* \* \*